United States Patent
Kuhmann et al.

(10) Patent No.: US 7,523,361 B2
(45) Date of Patent: Apr. 21, 2009

(54) ERROR CONDITION HANDLING

(75) Inventors: Juergen Kuhmann, Foster City, CA (US); Stefan Wolf, San Jose, CA (US); Roland Schabram, Somerset, CA (US); Hasnain Jaffery, San Jose, CA (US)

(73) Assignee: SAP AG, Walldorf (DE)

( * ) Notice: Subject to any disclaimer, the term of this patent is extended or adjusted under 35 U.S.C. 154(b) by 363 days.

(21) Appl. No.: 10/310,669

(22) Filed: Dec. 4, 2002

(65) Prior Publication Data
US 2004/0153821 A1 Aug. 5, 2004

(51) Int. Cl.
*G06F 11/00* (2006.01)

(52) U.S. Cl. ............................................. 714/57; 705/1

(58) Field of Classification Search ................... 714/57, 714/26, 37, 39; 705/1, 34, 40; 707/200–202
See application file for complete search history.

(56) References Cited

U.S. PATENT DOCUMENTS

| | | | | |
|---|---|---|---|---|
| 5,047,977 A | * | 9/1991 | Hill et al. | 714/57 |
| 5,463,768 A | * | 10/1995 | Cuddihy et al. | 714/37 |
| 6,449,623 B1 | * | 9/2002 | Bohannon et al. | 707/202 |
| 6,507,852 B1 | * | 1/2003 | Dempsey et al. | 707/201 |
| 2002/0143575 A1 | * | 10/2002 | Hansen et al. | 705/2 |
| 2002/0143716 A1 | * | 10/2002 | Byrne et al. | 705/412 |
| 2002/0184133 A1 | * | 12/2002 | Zangari et al. | 705/36 |
| 2003/0069778 A1 | * | 4/2003 | Menninger et al. | 705/10 |
| 2004/0073500 A1 | * | 4/2004 | Owen, Jr. | 705/30 |
| 2005/0021701 A1 | * | 1/2005 | Seki et al. | 709/223 |

* cited by examiner

*Primary Examiner*—Robert Beausoliel
*Assistant Examiner*—Philip Guyton
(74) *Attorney, Agent, or Firm*—Kenyon & Kenyon LLP

(57) ABSTRACT

A method includes detecting an error by matching an error case definition to a message, determining whether an object associated with the message corresponds to the detected error, and based on a result of the determination, selectively generating a detected error report that includes information related to the message and the associated object.

20 Claims, 2 Drawing Sheets

ERROR CONDITION HANDLING

BACKGROUND

The following description relates to detecting and handling errors in a database.

Large volumes of customer data may be logged by a business, e.g., collected and stored in a database coupled to a computer system. For example, the data logged may relate to a consumer's use or purchase of a product (e.g., an electrical utility may collect and store energy consumption information from customers of the utility). During or after collection of the data, the data may be processed to determine customer billings, customer usage of a service, purchasing information, etc.

The customer data collected in the database may be processed by executing object-oriented programs ("objects"). Each object includes a definition of the data from the database that is described by the object. Each object may also include instructions ("logical sequences") to manipulate the data included in the object. As an example, a "payment method A" billing object for an electric utility business typically defines data from the database that is to be included in a billing document. In this example, the utility company's billing object includes instructions that determine the peak power demand for each customer and generates a bill, for example, at $10/power unit if the demand is above a certain value, and otherwise generates a bill at $7/power unit. Following the execution of the billing object, an invoicing object may be executed to determine what each customer is required to pay by determining additions and/or subtractions for taxes, credits, rebates, etc. During execution of either the billing object or the invoicing object errors may be detected due to missing information in the database and/or improper object definitions (e.g., incorrect data information or instructions in an object). For example, the invoicing object may include instructions for a company, "company B" that has not been defined as having a "payment method A" billing object. Therefore, when executed, the invoicing object will generate an error message such as "Payment method A not available for company code B".

In some cases, objects are associated with a particular business and referred to as "business objects".

SUMMARY

According to an aspect of this invention, a method includes detecting an error by matching an error case definition to a message, determining whether an object associated with the message corresponds to the detected error, and based on a result of the determination, selectively generating a detected error report that includes information related to the message and the associated object.

One or more of the following features may also be included: The method of generating a detected error report may include storing the detected error report. The method of generating a detected error report may include sending the detected error report to a user assigned to evaluate the report. The method may include having the object comprise an executable object. The method may include having the object include a data set definition, the data set definition corresponding to a subset of data from the database of messages. The method may include having the object comprise an object related to a business entity. The method may include having the database of messages include a database of log messages produced by an application based on customer information related to the business entity. The method may further include matching at least one text message in the log message with a text message in the error case definition. The method may further include defining an error case definition. The method may include having the error case definition include at least one text-based message. The method may include having the error case definition include at least one business object. The method may further include correcting the detected error case based on an associated rule object. The method may further include determining whether the detected case matches a prior detected case. The method may further include determining whether a detected error case has an associated priority, and setting a priority of the detected case to the determined associate priority as part of the detected error report. The method may further include determining whether a process is associated with the message corresponding to the detected error case, and including the determined process as part of the detected error report. The method may further include associating a set of detected error cases. The method may further include selectively permitting access to the set of associated detected error cases to an assigned user. The method may include having access to the set of detected error cases controllable by an individual assigned a controlling role. The method may include having the user have access to the set of detected error cases is an employee of a business. The method may further include accessing the detected error case from a user device coupled to a computer network.

According to a further aspect of this invention a system includes a computer coupled to a storage device, the storage device holding a database of log messages based on consumer information and corresponding to an output of a business application, and an application executable by the computer to determine whether a log message in the database matches an error case definition, the application to determine if a business object is associated with the determined log message matching the error case definition.

One or more of the following features may also be included: The system may include having a set of detected error cases assigned to a user, the application executable to detect an update of a one of the set of error cases.

The performance of one or more of the described implementations may provide several advantages. For example, in some implementations the amount of time spent by a user to evaluate and correct a detected error case may be reduced. A user may access a detected error case report that includes information related to a detected error message, and may also include information related to a process (e.g., an object) that generated the detected error message. The detected error case report may be useful to correct the detected error and thus minimize or eliminate the need to "backtrack" through an execution path to determine related objects. In some implementations, the reporting of duplicate error cases is eliminated, therefore duplicate cases need not be evaluated by a user. In some implementations, a statistical summary of activity relating to objects executed during the performance of the process is collected and may be viewed by a user.

The details of one or more embodiments are set forth in the accompanying drawings and the description below. Other features and advantages will be apparent from the description and drawings, and from the claims.

DESCRIPTION

Figure 1:
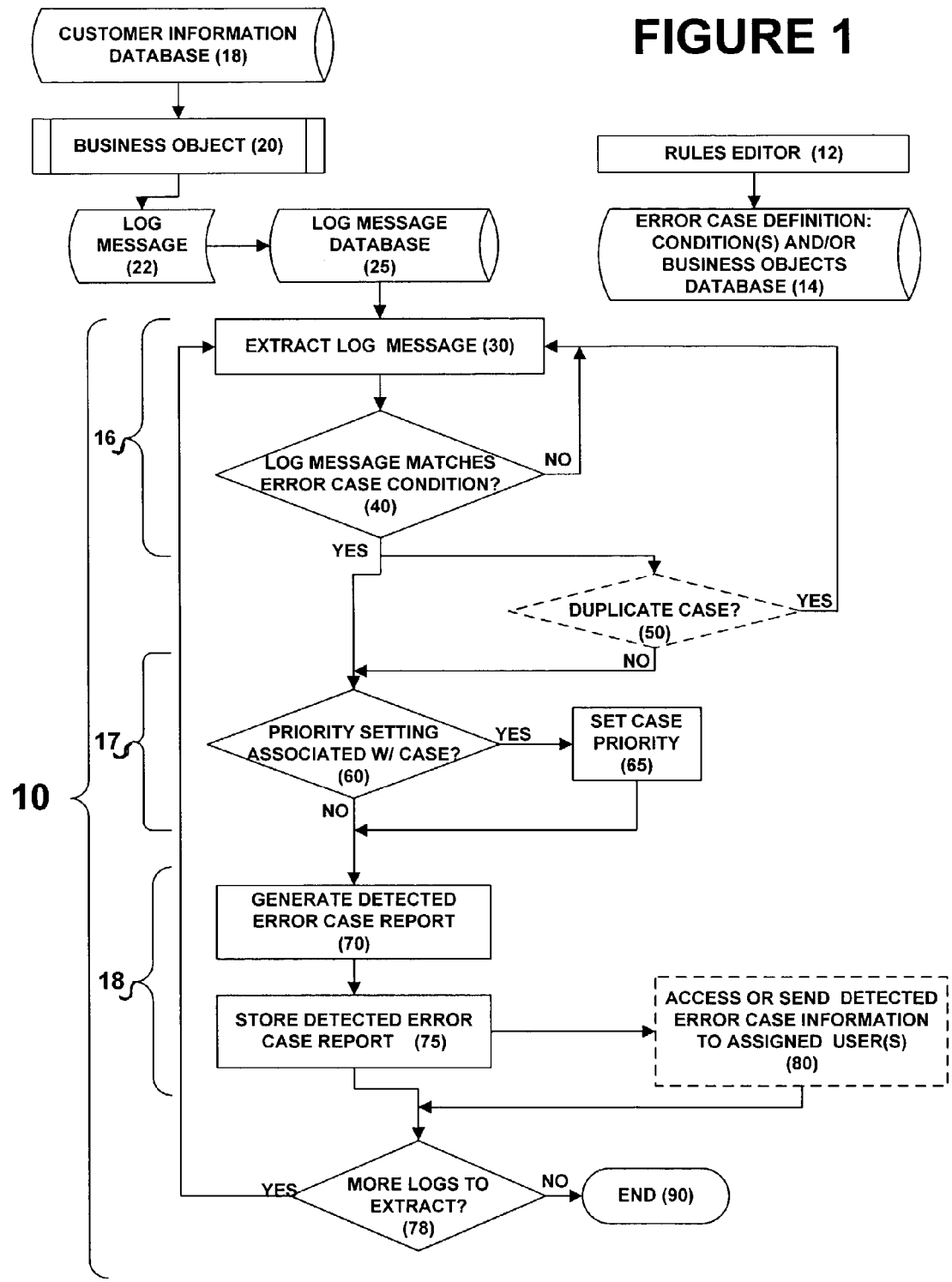
FIG. 1 is a flowchart of a database analysis process.

Referring to FIG. 1, a process 10 may be performed to detect and report "error cases" contained in log messages 22 stored in a database 25. An error case refers to a log message that includes information matching an error case definition and is considered a case that needs to be handled by a user (e.g., evaluated and/or corrected with human intervention).

Prior to performance of process 10, a business object 20 (an executable application) is executed using data from a customer information database 18. Business object 20 outputs a log message(s) 22 which is stored in a log message database 25. Prior to performance of process 10, a rules editor 12 may be used to define an "error case", each error case definition including at least one condition (e.g., a specific text message) that is considered an error case if found in a log message. An error case definition may include a condition that is a combination of specific text messages. The error case definition may also include a business object associated with a text message(s). For example, an error case condition may include a combination of text messages such as: "Bill could not be created for business B" and "Price XX does not exist". Each error case definition is stored in an error case definition database 14.

Process 10 is basically a three-part process, indicated generally in FIG. 1 by parts 16, 17 and 18. In FIG. 1, the elements shown by dotted lines are optional, as further explained below. The first part (16) of process 10 includes extracting (30) a log message from log database 25 and determining (40) whether the log message matches a condition of an error case definition from database 14. If the log message does match an error condition from database 14, the second part (17) of process 10 is performed. The second part (17) of process 10 includes determining (60) whether there is a priority setting associated with a determined error case, and setting (65) the priority to the determined associated priority. Examples of such priorities may include "urgent", "medium", or "low", thereby indicating to a human operator the degree of urgency with which the detected error case should be accorded. The third part (18) of process 10 includes generating (70) a detected error case report for the determined error case, and storing (75) the detected error report. The detected error case report may include information from the log message considered in error, and may also include information related to a process (or object) that generated the log message. Any process (or object) information included in the detected error case report may be useful to an operator for correction of a detected error case. In an embodiment, an object associated with a detected error case is defined by using rule editor 12 and storing the associated object in database 14.

Each detected error case report may include information from the corresponding error case definition as well as information identifying an object(s) associated with the error condition. For example, "Payment method A not available for company code B" refers to two objects: i.e., a "Payment method" object and a "Company code" object. References to these two objects may be included in a detected error case report since they may be useful to correct the detected error case.

In a conventional system, an error report corresponding to a detected error typically is relatively short and cryptic. As a result, determining which object(s) may be related to the detected error conventionally was a relatively difficult task and would cause delays in correcting an error since an error must be evaluated "in context" to correct the error, i.e., the user must determine which object(s) are related to the detected error, and/or determine which object(s) are required to correct the detected error.

Still referring to FIG. 1, following storing (75) of a detected error case report, process 10 includes determining (78) if more log messages are available to extract from database 25, and if there are more log messages available to extract, returning to extracting (30) log messages, otherwise ending (90) process 10.

Additional optional features may be incorporated into process 10. These features are shown in dotted lines on FIG. 1. For example, process 10 may determine (50) whether a duplicate detected error case already has been processed. Therefore, if a common error exists in several log messages stored on database 25, only one detected error case report will be stored (75) instead of generating multiple cases for the same error.

Each detected error case, or category of detected error cases, may have an assigned user (e.g., a human operator) who may be responsible for evaluating, correcting and/or logging a correction to the detected error case. Process 10 optionally may include accessing (80) or sending (80) each detected error case report to an assigned user. The assigned user is responsible for evaluating, and/or correcting the detected error case. Once a detected error case has been corrected (e.g., changed) by a user, the completion of the correction may be input to a database to track the work on the detected error case.

Performing the process 10 to detect and present detected error cases may reduce the amount of time a user must spend to evaluate and correct a detected error case. For example, process 10 may be used to present a user with a detected error case report that includes related objects, therefore the user need not backtrack through the execution path that created the log message to determine those related objects.

Accessing/sending (80) a detected error case report may include generating a "work list" of detected error cases assigned to a user(s). The work list represents a set of cases that may be accessed by the assigned user(s), or sent to the assigned user(s) by e-mail, for example. The work list of cases may be sent or accessed by a customer or a business over a computer network. A user may have authority to revoke a case assignment and return the case to the work list. A supervisor may have authority to revoke a case reservation or re-assign a case from one user to another user.

The worklist of detected cases may be distributed to multiple users by using a records management ("work flow") procedure. For example, a set of users may be assigned to handle any case on a worklist of detected cases based on a case category. Once a first user begins to evaluate a first case from the worklist, that case will be removed from the available cases (e.g., the first case will be removed from the inbox of the other users in the set of users).

As detected error cases from the worklist are evaluated and/or corrected, status information related to accesses and/or corrections of detected error cases may be stored on error case definition database 14.

Process 10 may be performed in real-time by a user, or may be performed as a batch job. In either case, process 10 may provide statistics related to an analysis of log message database 25, e.g., how many objects were selected for execution, how many objects completed successfuly, how many objects caused detected error cases during execution, etc.

Figure 2:
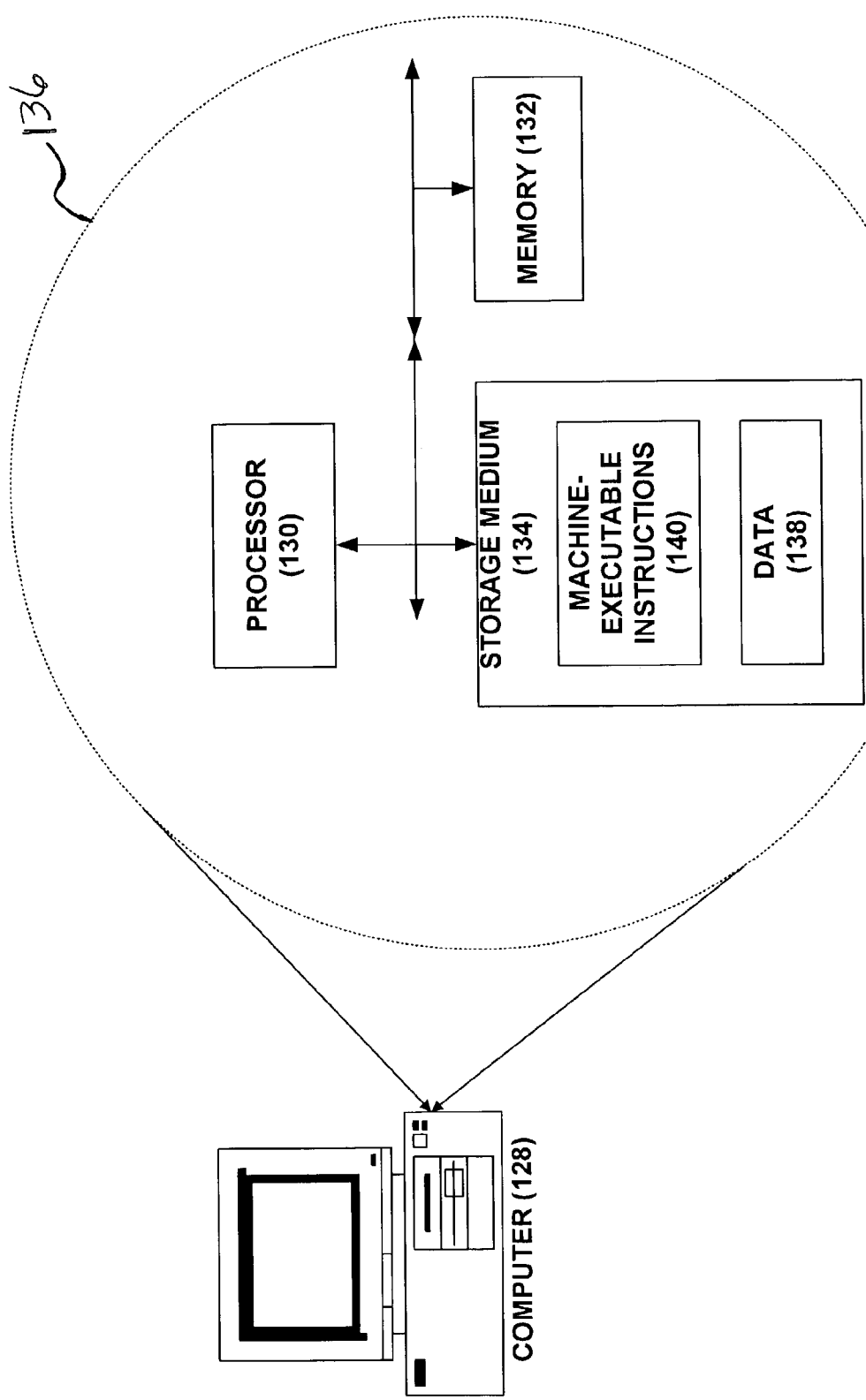
FIG. 2 is a block diagram of computer hardware on which processes corresponding to FIG. 1 may be implemented.

FIG. 2 shows a computer 128 on which process 10 may be implemented. Computer 128 includes a processor 130, a memory 132, and a storage medium 134 (see view 136). Storage medium 134 stores data 138 for machine-executable instructions 140 that are executed by processor 130 out of memory 132 to perform process 10. Computer 128 may include an operating system.

Computer 128 and instructions 140 need not be limited to use with the hardware and software of FIG. 2. They may find applicability in any computing or processing environment.

They may be implemented in hardware, software, or a combination of the two. They may be implemented in computer programs executing on programmable computers or other machines that each include a processor, a storage medium readable by the processor (including volatile and non-volatile memory and/or storage components), at least one input device, and one or more output devices. Program code may be applied to data entered using an input device (e.g., a mouse or keyboard) to perform applications and to generate output information.

Each computer program may be stored on a storage medium/article (e.g., CD-ROM, hard disk, or magnetic diskette) that is readable by a general or special purpose programmable computer for configuring and operating the computer when the storage medium or device is read by the computer to perform applications.

As used herein, the term "computer system" refers to a physical machine having one or more processing elements and one or more storage elements in communication with the one or more of the processing elements. Each of the various user devices and computers described herein include an operating system. The operating system is software that controls the computer system's operation and the allocation of resources. The term "process" or "program" refers to software, for example an application program that may be executed on a computer system. The application program is the set of executable instructions that performs a task desired by the user, using computer resources made available through the operating system.

Computer 128 may be coupled to a "wide area network" (WAN), i.e., a network of inter-connected computers that may communicate with one another, such as an Internet.

The processes, methods and techniques described here need not be limited to the specific details described above.

Other embodiments are within the scope of the following claims.

What is claimed is:

1. A method comprising:
   executing a business object comprising an executable application to manipulate a data object in a customer information database;
   generating by the business object a log message;
   storing the log message in a log message database;
   storing a plurality of error case definitions in an error case definition database;
   detecting an error by matching the log message to a first error case definition of the plurality of error case definitions;
   identifying a user assigned to the first error case definition;
   selectively generating an error case report that includes information identifying the business object, the data object, and the first error case definition;
   sending to the user the selectively generated error case report;
   storing in a database a copy of the selectively generated error case error;
   determining if a second error case report matches the selectively generated error case report; and
   preventing the second error case report from being sent to the user.

2. The method of claim 1, further comprising:
   determining if the first error case definition has an associated priority; and
   setting a priority of the selectively generated error case report to the determined associated priority.

3. The method of claim 1, wherein the business object is a billing object and the data object is customer data.

4. The method of claim 1, wherein the business object is an invoicing object and the data object is customer data.

5. The method of claim 1, wherein the first error case definition defines a scenario where the data object is incompatible with the business object.

6. The method of claim 1, wherein the selectively generated error case report is sent over electronic mail.

7. A method comprising:
   executing a business object comprising an executable application to manipulate a data object in a customer information database;
   generating by the business object a log message;
   storing the log message in a log message database;
   storing a plurality of error case definitions in an error case definition database;
   detecting an error by matching the log message to a first error case definition of the plurality of error case definitions;
   identifying a first user assigned to the first error case definition;
   selectively generating an error case report that includes information identifying the business object, the data object, and the first error case definition;
   sending to the first user the selectively generated error case report;
   detecting a second error by matching the log message to a second error case definition of the plurality of error case definitions;
   identifying a second user assigned to the second error case definition; and
   sending to the second user a second selectively generated error case report that includes information identifying the business object, the data object, and the second error case definition.

8. The method of claim 7, further comprising:
   generating a work list from the selectively generated error case report and the second selectively generated error case report; and
   distributing the work list to multiple users with a work flow procedure.

9. The method of claim 8, further comprising:
   removing the selectively generated error case report from the work list in response to one of the multiple users beginning to evaluate the selectively generated error case report.

10. The method of claim 7, wherein the selectively generated error case report is sent over electronic mail.

11. A system comprising:
    a display;
    a processor; and
    a memory coupled to the processor, the memory storing instructions adapted to be executed by the processor to:
    execute a business object comprising an executable application to manipulate a data object in a customer information database;
    generate a log message;
    store the log message in a log message database;
    store a plurality of error case definitions in an error case definition database;
    detect an error by matching the log message to a first error case definition of the plurality of error case definitions;
    identify a user assigned to the first error case definition;
    selectively generate an error case report that includes information identifying the business object, the data object, and the first error case definition;

send to the user the selectively generated error case report;

store in a database a copy of the selectively generated error case report;

determine if a second error case report matches the selectively generated error case report; and prevent the second error case report from being sent to the user.

12. The system of claim 11, wherein the memory stores additional instructions adapted to be executed by the processor to:

determine if the first error case definition has an associated priority; and set a priority of the selectively generated error case report to the determined associated priority.

13. The system of claim 11, wherein the business object is a billing object and the data object is customer data.

14. The system of claim 11, wherein the business object is an invoicing object and the data object is customer data.

15. The system of claim 11, wherein the first error case definition defines a scenario where the data object is incompatible with the business object.

16. The system of claim 11, wherein the selectively generated error case report is sent over electronic mail.

17. A system comprising:

a display;

a processor; and a memory coupled to the processor, the memory storing instructions adapted to be executed by the processor to:

execute a business object comprising an executable application to manipulate a data object in a customer information database;

generate a log message;

store the log message in a log message database;

store a plurality of error case definitions in an error case definition database;

detect an error by matching the log message to a first error case definition of the plurality of error case definitions;

identify a user assigned to the first error case definition;

selectively generate an error case report that includes information identifying the business object, the data object, and the first error case definition;

send to the user the selectively generated error case report;

detect a second error by matching the log message to a second error case definition of the plurality of error case definitions;

identify a second user assigned to the second error case definition; and send to the second user a second selectively generated error case report that includes information identifying the business object, the data object, and the second error case definition.

18. The system of claim 17, wherein the memory stores additional instructions adapted to be executed by the processor to:

generate a work list from the selectively generated error case report and the second selectively generated error case report; and distribute the work list to multiple users with a work flow procedure.

19. The system of claim 18, wherein the memory stores additional instructions adapted to be executed by the processor to:

remove the selectively generated error case report from the work list in response to one of the multiple users beginning to evaluate the selectively generated error case report.

20. The system of claim 17, wherein the selectively generated error case report is sent over electronic mail.

* * * * *